(12) United States Patent
D'Souza et al.

(10) Patent No.: US 6,415,284 B1
(45) Date of Patent: Jul. 2, 2002

(54) INTELLIGENT FORMS FOR IMPROVED AUTOMATED WORKFLOW PROCESSING

(75) Inventors: Roy Peter D'Souza, Sunnyvale; William Laurence Manning, Stanford, both of CA (US)

(73) Assignee: Rivio, Inc., Santa Clara, CA (US)

( * ) Notice: Subject to any disclaimer, the term of this patent is extended or adjusted under 35 U.S.C. 154(b) by 0 days.

(21) Appl. No.: 09/344,269

(22) Filed: Jun. 30, 1999

(51) Int. Cl.⁷ ............................................. G06F 17/30
(52) U.S. Cl. ........................................................ 707/3
(58) Field of Search .............................. 207/505, 507, 207/3

(56) References Cited

U.S. PATENT DOCUMENTS

| | | | |
|---|---|---|---|
| 4,667,292 A | 5/1987 | Mohlenbrock et al. | 364/406 |
| 4,831,526 A | 5/1989 | Luchs et al. | 705/4 |
| 4,916,611 A | 4/1990 | Doyle, Jr. et al. | 705/4 |
| 4,975,840 A | 12/1990 | DeTore et al. | 705/4 |
| 5,070,452 A | 12/1991 | Doyle, Jr. et al. | 705/4 |
| 5,191,522 A | 3/1993 | Bosco et al. | 705/4 |
| 5,410,646 A | * 4/1995 | Tondevold et al. | 395/149 |
| 5,490,243 A | * 2/1996 | Millman et al. | 395/148 |
| 5,655,085 A | 8/1997 | Ryan et al. | 705/4 |
| 5,970,464 A | 10/1999 | Apte et al. | 705/4 |
| 6,035,276 A | 3/2000 | Newman et al. | 705/2 |
| 6,112,986 A | 9/2000 | Berger et al. | 235/380 |

OTHER PUBLICATIONS

Drancheck, John S. et al., "Building ACCESS2 Applications Using Point–And–Click Programming", John Wiley and Sons, (New York, 1995), p. 75–76, 124–133.*

Lintz, Paul R., "Examiner's Exhibit A", Microsoft Access 97 Help File Printout, Downloaded from Microsoft Access 97 on Jun. 8, 2001, copyright date, 1989–1996, Examiner's pages 5–7.*

Insurance related papers downloaded from the NAIC, National Association of Insurance Commissioners, we site at http://www.naic.org (4 pages).

Draft Document entitled "Electronic Commerce and Regulation Issues," dated Mar. 15, 1999 from the NAIC, National Association of Insurance Commissioners, web site (13 pages).

\* cited by examiner

Primary Examiner—Diane D. Mizrahi
(74) Attorney, Agent, or Firm—James D. Ivey

(57) ABSTRACT

Fields of smart forms include default logic and verification logic to simplify filling in of the smart form by an employee and reduce the likelihood that errors in data entry occur. In particular, the default logic determines a default value for a field in the form according to one or more data items in a comprehensive company database. Verification logic verifies that the employee has entered valid form data in a particular field. The verification logic can include references to data items stored in the comprehensive company database such that data entered by the employee can be verified with respect to data already stored in the database. Data entered by the employee is stored in the database and can be used by default logic and/or verification logic in subsequently used smart forms.

21 Claims, 12 Drawing Sheets

FIELD 208A

TYPE 302

ALTERABLE 304

DEFAULT ANNOTATION 306

VERIFICATION ANNOTATION 308

DATA 310

FIGURE 3

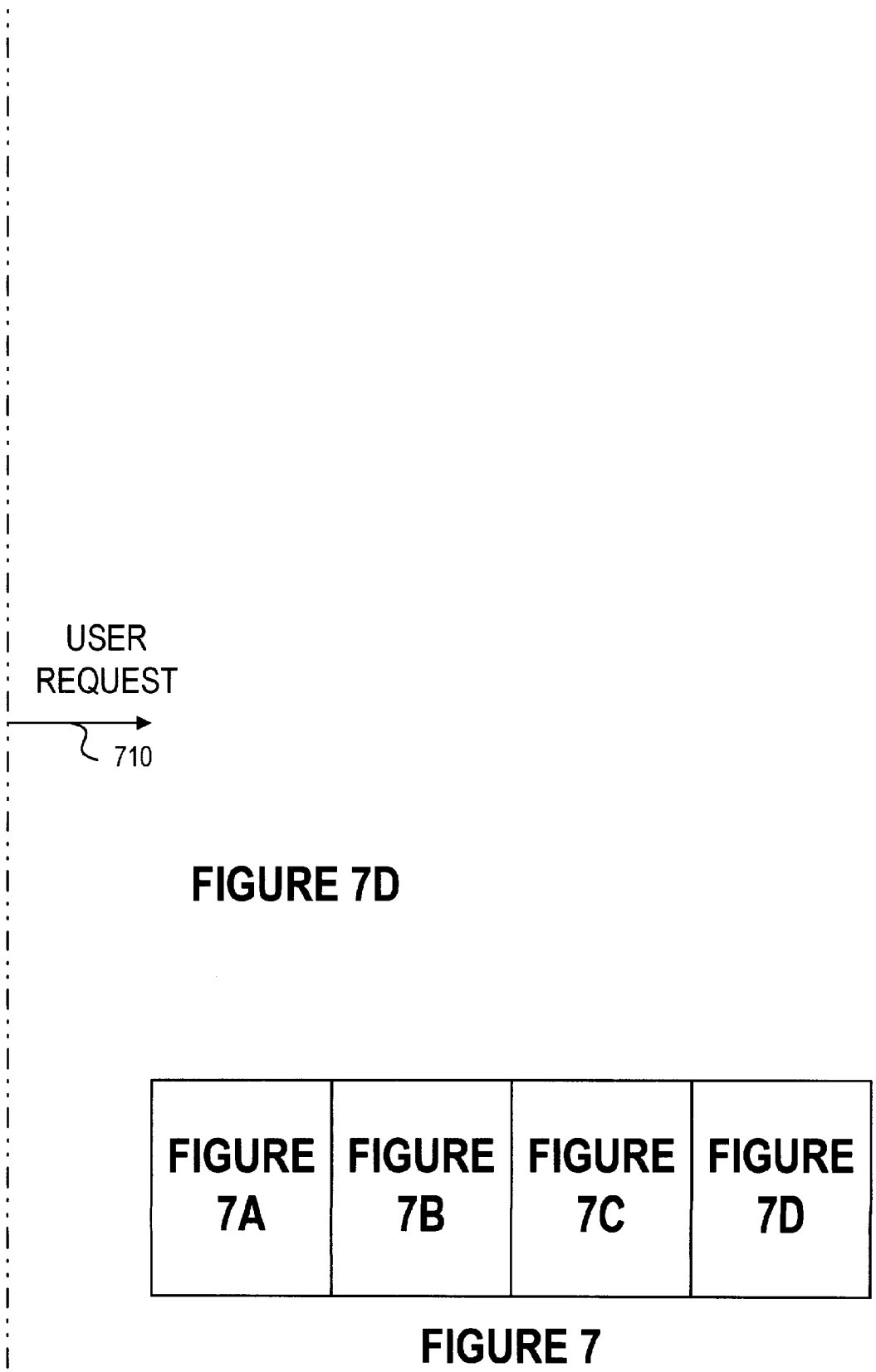

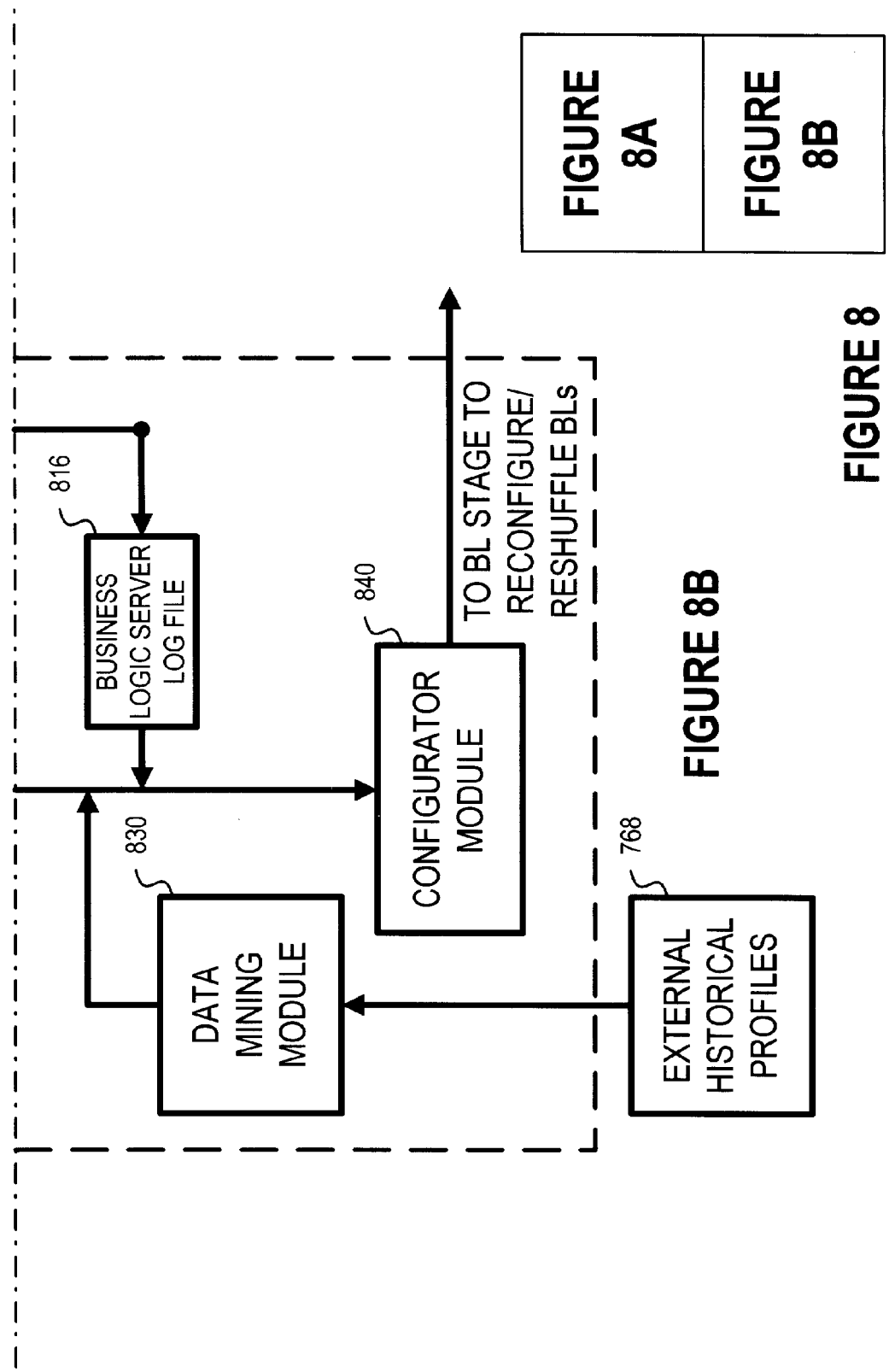

INTELLIGENT FORMS FOR IMPROVED AUTOMATED WORKFLOW PROCESSING

CROSS REFERENCE TO RELATED APPLICATIONS

The present Application is related to the following co-pending U.S. patent applications, each of which is incorporated herein in its entirety by reference: (i) U.S. patent application Ser. No. 09/346,155 entitled "Improved Scalable Architecture for E-Commerce Applications" by Roy D'Souza and filed Jun. 30, 1999 now abandoned; (ii) U.S. patent application Ser. No. 09/345,225 entitled "Data Mining Aggregator architecture with Intelligent Selector" by Roy D'Souza and filed Jun. 30, 1999 pending; (iii) U.S. patent application Ser. No. 09/345,259 entitled "Data Mining With Dynamic Events" by Roy D'Souza and filed Jun. 30, 1999 now pending; and (iv) U.S. patent application Ser. No. 09/345,170 entitled "Data Mining With Decoupled Policy From Business Application" by Roy D'Souza and filed Jun. 30, 1999 now pending.

FIELD OF THE INVENTION

The present invention relates to commerce systems which include computers and computer networks and, in particular, to a particularly efficient system for collecting information and receiving bids for insurance coverage.

BACKGROUND OF THE INVENTION

Currently, computer-implemented workflows greatly improve information processing in the workplace. In particular, a workflow can track information of an event and ensure that proper notification of the event is delivered to appropriate personnel and that authorization is obtained for an event to proceed.

One area in which computer-implement workflow processing is vulnerable to error is the entry of requisite information by people initiating and/or processing workflows. Accordingly, a mechanism which simplifies information entry for workflow processing and/or reduces susceptibility of workflow processing to information entry errors is highly desirable.

SUMMARY OF THE INVENTION

In accordance with the present invention, fields of smart forms include default logic and verification logic to simplify filling in of the smart form by an employee and reduce the likelihood that errors in data entry occur. In particular, the default logic determines a default value for a field in the form according to one or more data items in a comprehensive company database. Including the default value in the form reduces the amount of time required by the employee to fill in the smart form with form data. In addition, alteration of the default value can be prohibited, thereby reducing the likelihood of erroneous data being entered.

Verification logic verifies that the employee has entered valid form data in a particular field. The verification logic can include references to data items stored in the comprehensive company database such that data entered by the employee can be verified with respect to data already stored in the database. Accordingly, introduction of errors in form data is further prevented.

Data entered by the employee is stored in the database and can be used by default logic and/or verification logic in subsequently used smart forms.

BRIEF DESCRIPTION OF THE DRAWINGS

FIG. 3 is a block diagram of a field of the smart form of FIG. 2 in greater detail.

DETAILED DESCRIPTION

In accordance with the present invention, intelligent forms are intelligently pre-populated using a business database and include logic for verification of properly supplied data to minimize effort in filling in such forms and to minimize the risk of accepting invalid form data, thus reducing the system's susceptibility to error.

Figure 1:
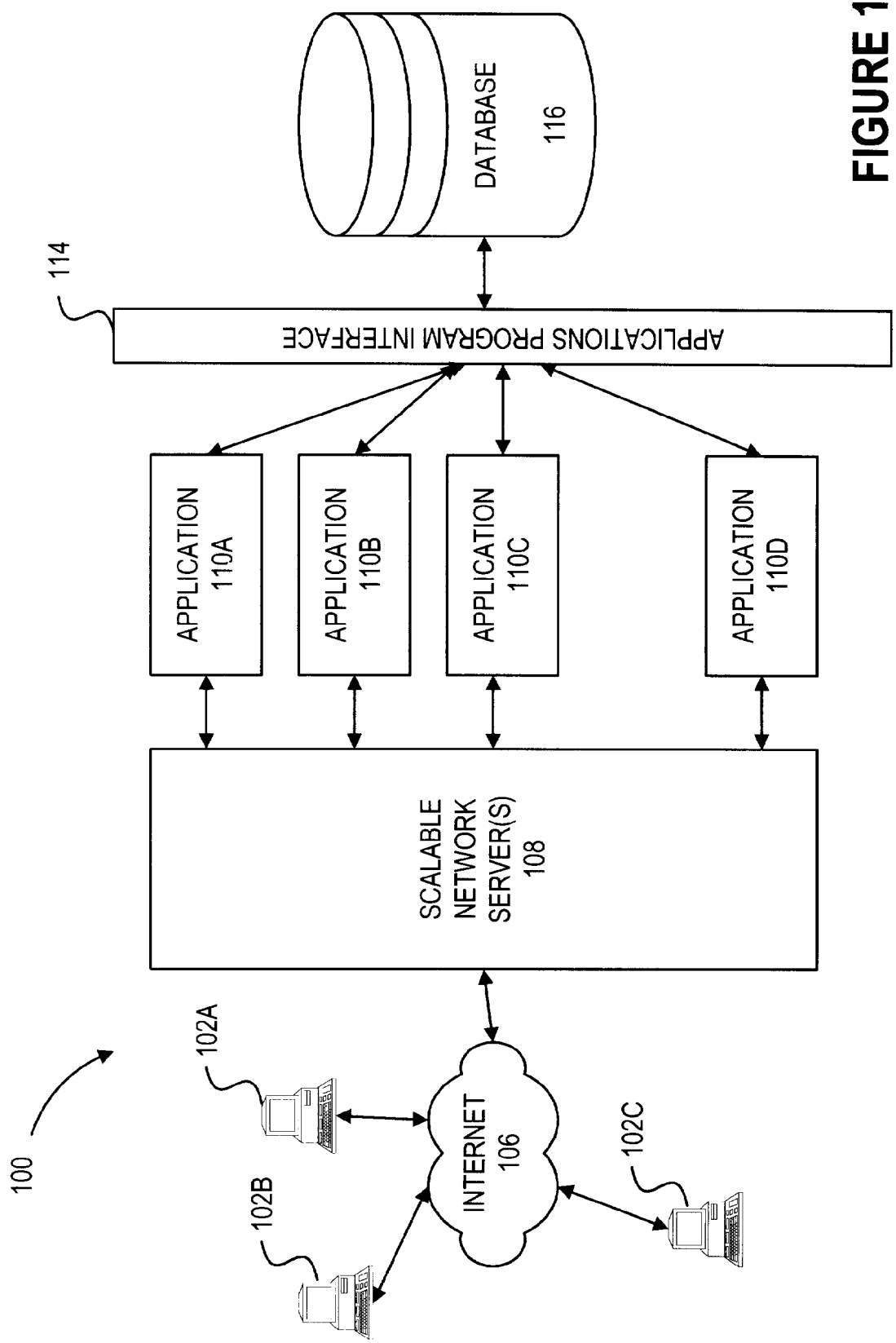
FIG. 1 is a block diagram of a computer system which implements smart form for workflow improvement in accordance with the present invention.

FIG. 1 shows a networked computer system 100 for processing insurance applications. Computer system 100 is described more completely below. A brief description of computer system 100 is included for completeness and facilitates understanding and appreciation of the application process described herein.

A number of computers 102A–C are coupled through a wide area network 106, such as the Internet, to a scalable network server 108. In this illustrative example, computers 102A–C are used by human employees of a business concern. The business concern of this illustrative example is sometimes referred to as the subject company. Only three computers 102A–C used by employees are shown while it is appreciated that numerous additional computers for respective additional employees can be added.

Scalable network server 108 includes a number of individual network servers, load balancers, and routers as described more completely below. Briefly, scalable network server 108 routes data between computers 102A–C on one end and applications 110A–D on the other end.

Applications 110A–D access data in a database 116 through an applications programming interface (API) 114. The subject company uses applications 110A–D to perform a number of business functions. Such business functions include, for example, payroll, accounting, benefits administration, and inter-office communications such as e-mail. Each of these functions can be performed by all or part of one or more applications such as applications 110A–D, each of which stores data for such functions in database 116. As a result, database 116 evolves to include an ever increasingly complete record of each employee of the subject company. While only applications 110A–D are shown, it is appreciated that other applications can be included.

Figure 2:
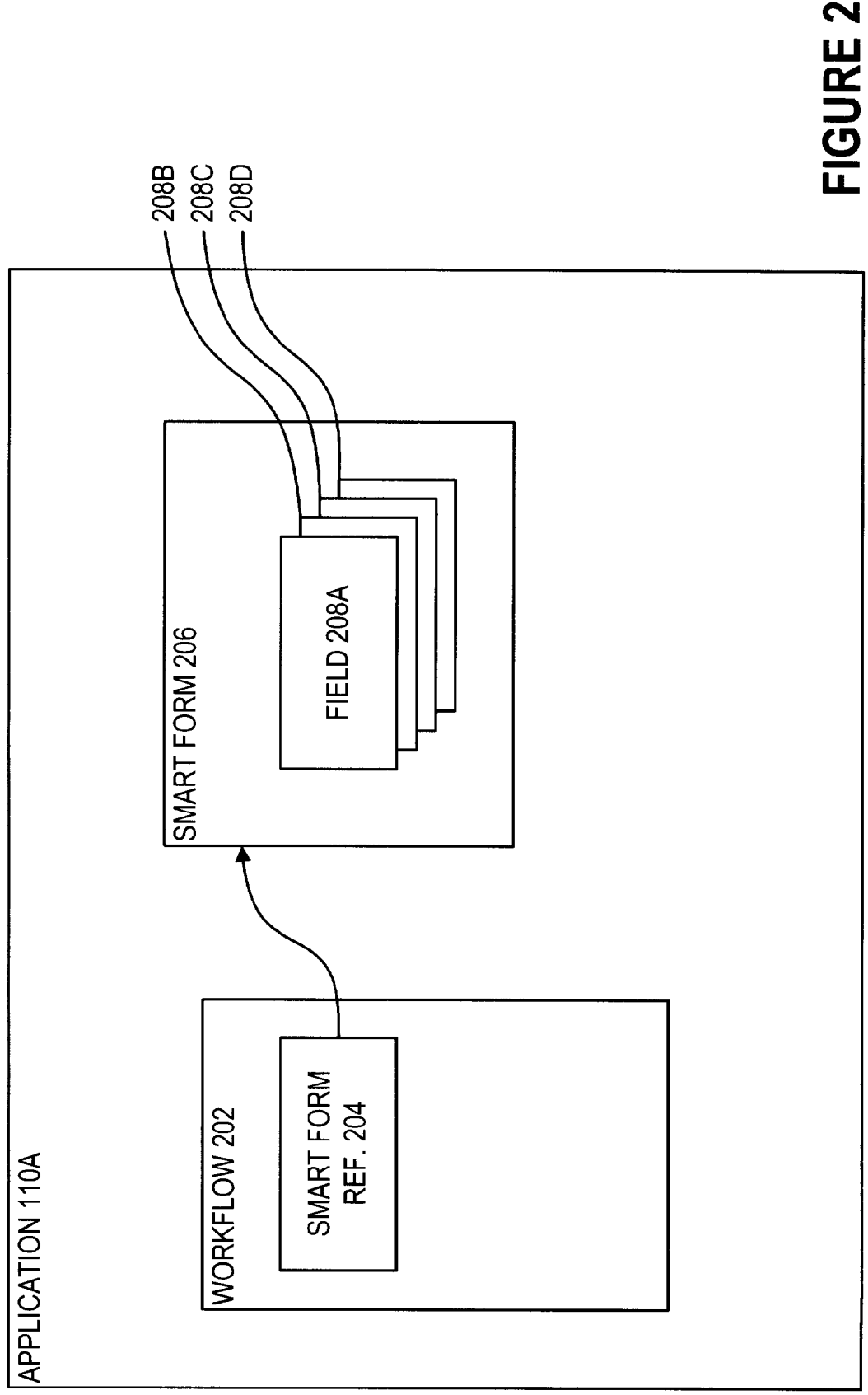
FIG. 2 is a block diagram of an application of FIG. 1 in greater detail, showing a workflow which includes a reference to a smart form according to the present invention.

In this illustrative example, application 110A implements a workflow 202 (FIG. 2). Applications 110B–D (FIG. 1) can also implements workflows such as workflow 202. Accordingly, the following description of application 110A is equally applicable to applications 110B–D.

Workflow 202 (FIG. 2) includes a number of actions to be taken by application 110A in carrying out a task which typically includes interaction with one or more employees of the subject company. To interact with an employee of the subject company, workflow 202 includes a smart form reference 204 which identifies a smart form 206. Smart form 206 includes a number of fields 208A–D, each of which corresponds to a particular piece of information which is used in carrying out the task of workflow 202. While four fields 208A–D are shown, it is appreciated that smart form 206 can include fewer or more fields.

Fields 208A–D are analogous to one another, and the following description of field 208A is equally applicable to fields 208B–D. Field 208A is shown in greater detail in FIG. 3.

Field 208A includes type data 302, an alterable flag 304, a default annotation 306, and a verification annotation 308. Type data 302 indicates whether field 20 8A is (i) generic with respect to the subject company, (ii) generic with respect to a department within the subject company, (iii) specific to an employee and mandatory, and (iv) specific to an employee and optional. Fields which are generic to a company correspond to data located within a company record of database 116 (FIG. 1) corresponding to the subject company. Fields which are generic to a department correspond to data located within a department record of database 116. Fields which are specific to an employee correspond to data stored within an employee recorded of database 116. Mandatory fields must have satisfactory data supplied by the employee before processing of the corresponding workflow is permitted to proceed. Optional fields can be left blanks and the workflow can proceed.

Alterable flag 304 (FIG. 3) contains data indicating whether data other than the default value supplied by default annotation 306 can be altered.

Annotations 306–308 are logic which can include references to data contained in records in database 116 (FIG. 1). Default annotation 306 (FIG. 3) includes logic which specifies a default data value for field 208A. Alterable flag 304 specifies whether data different than the default can be entered for field 208A. The logic of default annotation 306 can include references to data contained in database 116 (FIG. 1). For example, if field 208A corresponds to an employee's name, default annotation 306 can specify that the employee's name is retrieved from database 116 (FIG. 1), and alterable flag 304 can indicate that the employee's name cannot be changed—at least not through this illustrative example of smart form 206 (FIG. 2). The logic of default annotation 306 (FIG. 3) can be more complicated as well. For example, if field 208A represents the number of vacation days available to an employee, default annotation 306 can include logic which determines the number of days available from data stored in the employee's record in database 116 (FIG. 1)—e.g., the length of time for which the employee has been employed by the subject company, the hours worked by the employee, and the number of vacation days already used by the employee.

Verification annotation 308 (FIG. 3) includes logic which processes data entered by an employee and indicates whether the entered data is valid. Verification annotation 308 can also include references to data stored in database 116. For example, if field 208A represents a number of vacation days requested by an employee, verification logic 308 can include logic which compares the requested vacation to the number of days of vacation available to the employee.

Field 208A also includes space for data 310 which is the substantive value of the information represented by field 208A.

Default annotation 306 is typically executed within application 110A (FIG. 1) since application 110A is relatively close to database 116, at least relative to computers 102A–C, and. can therefore quickly and efficiently resolve references within default annotation 306 (FIG. 3) to items of data within database 116. Verification annotation 308 can also be executed by application 110A, however, such generally requires that smart form 206 is transferred to one of computers 102A–C, e.g., computer 102A in this example, and transferred back to application 110A and back to computer 102A if the form is not properly populated by the employee. Such generally exacerbates traffic congestion on wide area network 106.

Alternatively, application 110A resolves references to data items stored in database 116 by substituting the substantive data values for such data items for such references within verification annotation 308. As a result, verification annotation 308, when received by computer 102A, includes no references to data items within database 116 but data constants where such references had been. Verification annotation 308 is then executed within computer 102A. Verification annotation 308 executes as a Java script within computer 102A in one embodiment.

In either case, indication by verification annotation 308 (FIG. 3) that data supplied for field 208A is invalid results in rejection of smart form 206 (FIG. 2). If verification annotation 308 (FIG. 3) is executed by application 110A, rejection of smart form 206 (FIG. 2) results in re-submission of smart form 206 to computer 102A with notification to the employee regarding which of fields 208A–D are improperly populated by the employee. If verification annotation 308 (FIG. 3) is executed within computer 102A, computer 102A can wait until the entirety of smart form 206 is completed before verifying each of fields 208A–D and can then notify the employee of the non-conformance of data entered in smart form 206.

Alternatively, verification annotation 308 (FIG. 3) can be executed upon detection that the user has activated a field other than field 208A after entering data corresponding to field 208A. From the employee's perspective, field 208A is active once the employee places a cursor within a graphical or textual representation of field 208A to enter data. Once the employee has entered data in the representation of field 208A, placing the cursor within a graphical or textual representation of another field triggers execution of verification annotation 308 (FIG. 3). Upon indication by verification annotation 308 that data entered is invalid, a pop-up window appears to notify the employee of the non-compliance and positions the cursor within the graphical/textual representation of field 208A.

It is appreciated that verification annotation 308 can distinguish mandatory and optional fields as defined by field type 302 by characterizing null data as valid or invalid. Accordingly, types of fields can be limited to (i) generic to the subject company, (ii) generic to a department, and (iii) specific to the employee.

The combination of pre-populating unalterable fields and verifying propriety of data entered for alterable fields significantly reduces data entry errors. In addition pre-populating unalterable fields significantly reduces the time and effort required by employees to properly fill out forms required for various business functions.

Logic flow diagram 400 (FIG. 4). illustrates the processing of workflow 202 (FIG. 2) in response to activation by an employee using computer 102A. In this illustrative example, workflow 202 implements redemption by the employee of an earned bonus vacation.

In step 402 (FIG. 4), application 110A (FIG. 2), in executing workflow 202, identifies the employee. The employee can be authenticated according to an address, e.g., an IP address, of computer 102A or, preferably, through a conventional user-identification and password authentication procedure. The user is typically authenticated at the beginning of a session between computer 102A and application 110A, and logic flow diagram 400 (FIG. 4) represents a small portion of the session between computer 102A (FIG. 1) and application 110A.

In step 404 (FIG. 4), application 110A (FIG. 2) retrieves and begins execution of workflow 202, typically in response to an action taken by the user, e.g., actuation of a graphical user interface (GUI) button presented on a web-page.

Figure 4:
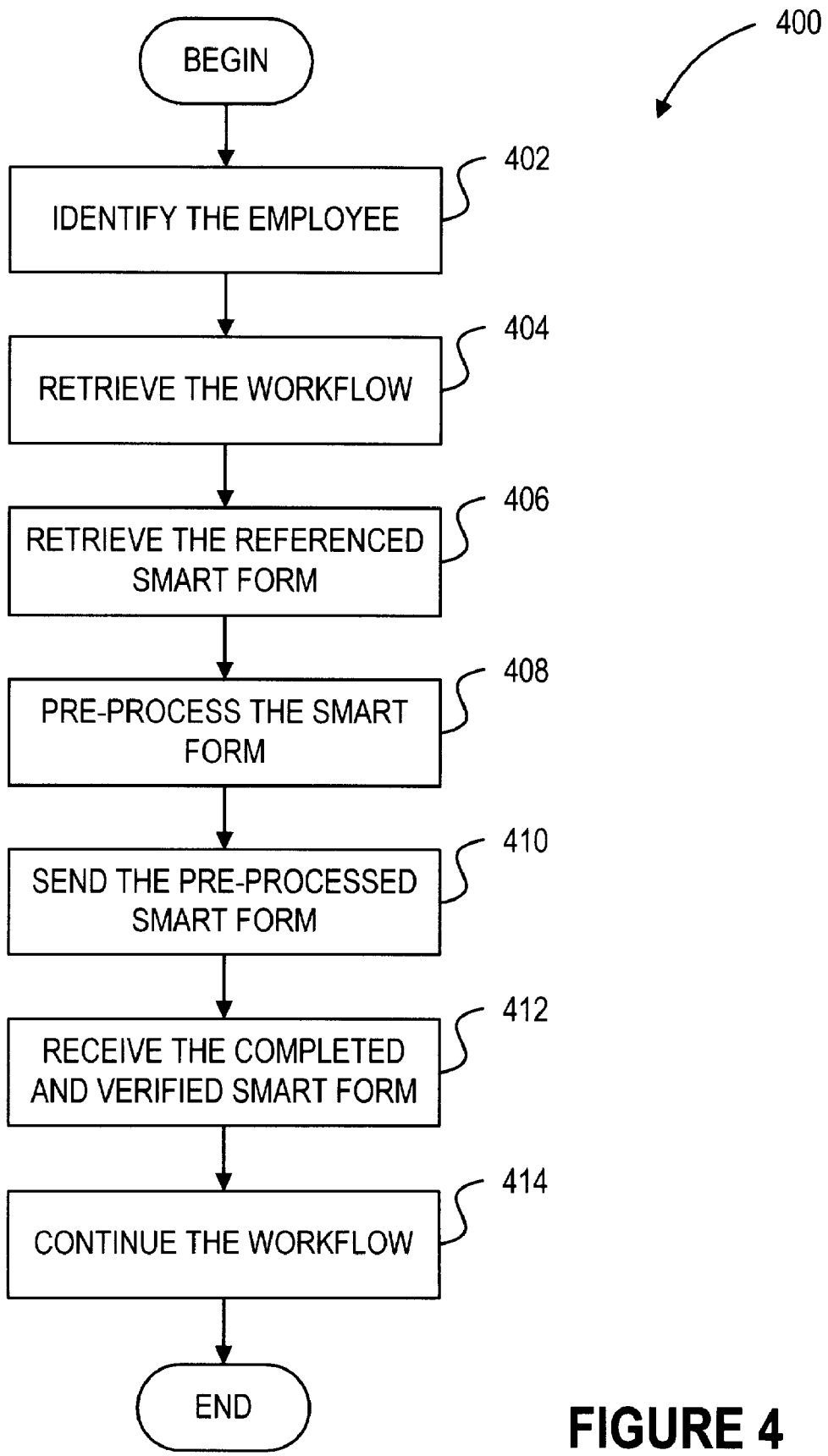
FIG. 4 is a logic flow diagram of the processing of a workflow in accordance with the present invention.
Figure 5:
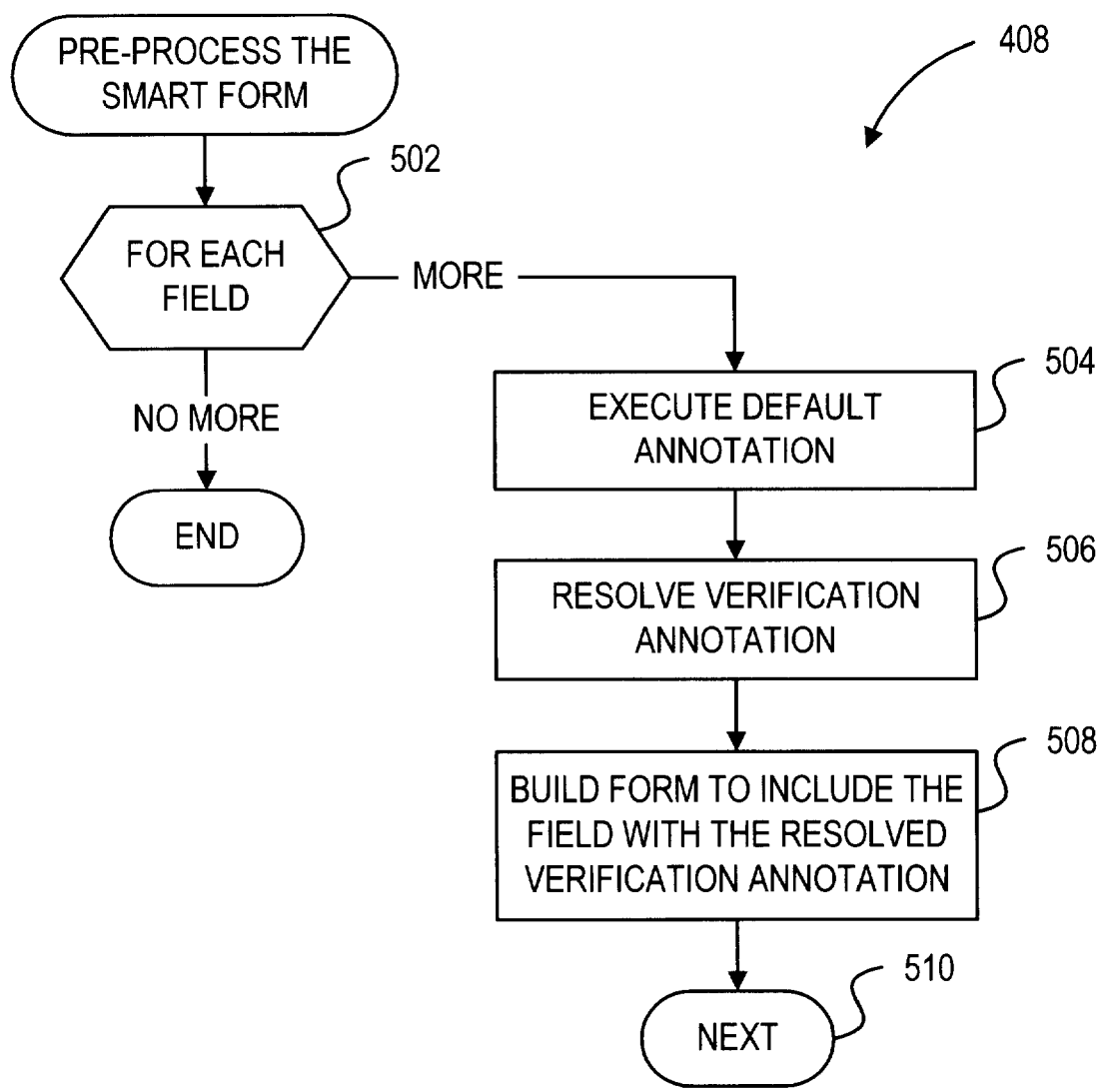
FIG. 5 is a logic flow diagram illustrating a step of FIG. 4 in greater detail, preprocessing the smart form of FIG. 2 in accordance with the present invention.

In executing workflow 202, application 110A uses reference 204 to retrieve and initiate execution of smart form 206 in step 406 (FIG. 4). In step 408, application 110A (FIG. 2) pre-processes smart form 206 as shown in greater detail as logic flow diagram 408 (FIG. 5).

Loop step 502 and next step 510 define a loop in which each of fields. 208A–D (FIG. 2) is process according to steps 504–508 which are described in the context of field 208A noting that processing of steps 208B–D is analogous.

In step 504 (FIG. 5), application 110A (FIG. 2) executes default annotation 306 (FIG. 3) to determine a default value for field 208A. As described above, execution of default annotation 306 can include retrieval of one or more data items from database 116 (FIG. 1). In addition, default annotation 306 can be a null operation such that there is no default data value for field 208A.

In step 506 (FIG. 5), application 110A (FIG. 2) resolves verification annotation 308 (FIG. 3) such that all references to data items of database 116 (FIG. 1) are replaced with data values retrieved from database 116, such that subsequent access to database 116 by computer 102A is unnecessary.

In step 508 (FIG. 5), application 110A (FIG. 2) includes logic, e.g., in the Java scripting language, in a form to implement field 208A as resolved.

After step 508 (FIG. 5), processing transfers through next step 510 to loop step 502 to process the next of fields 208A–D. Once all fields have been so processed, processing according to logic flow diagram 408, and therefore step 408 (FIG. 4), completes.

In step 410, application 110A (FIG. 1) sends the pre-processed smart form to computer 102A for completion by the employee.

Figure 6:
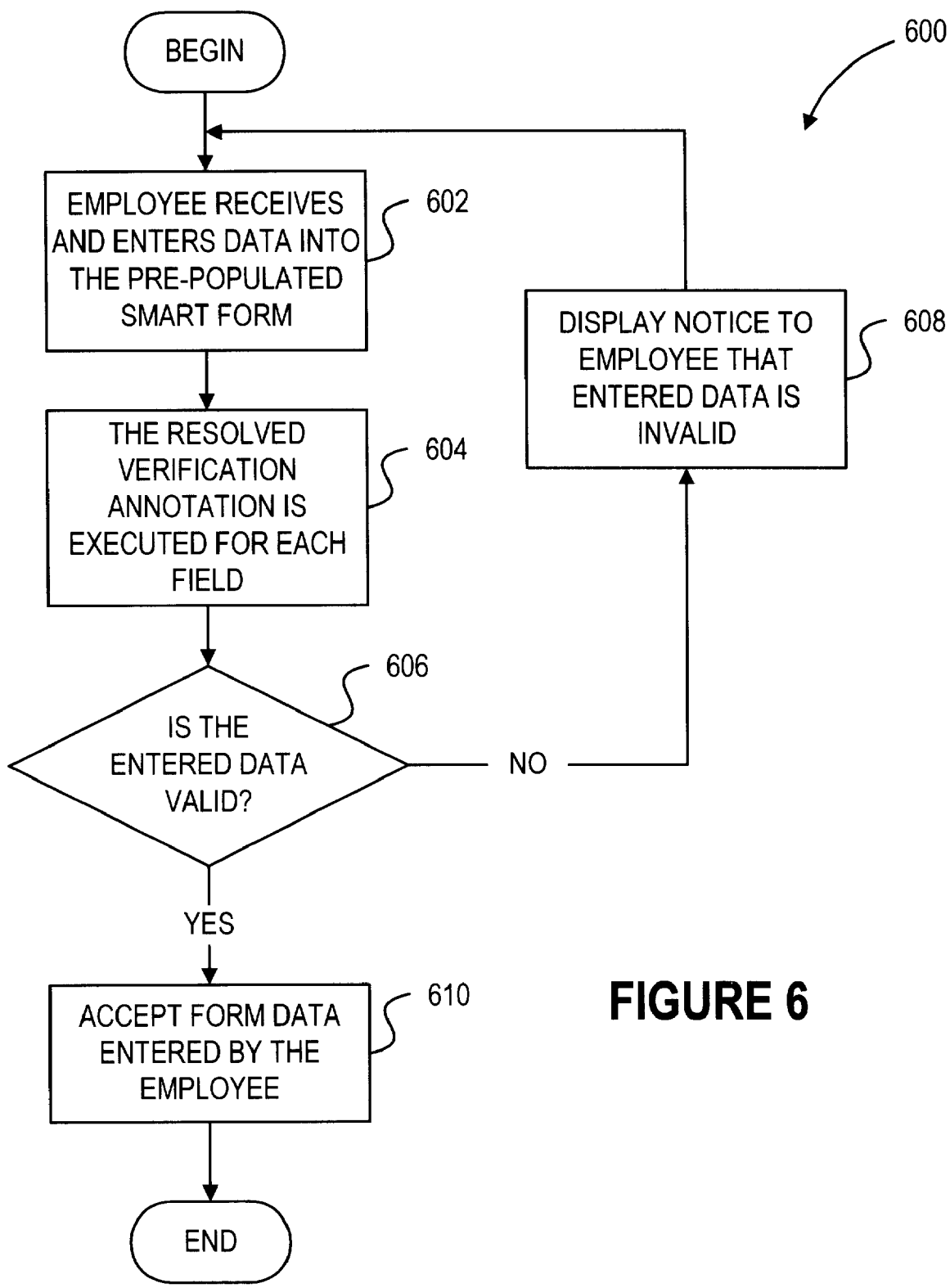
FIG. 6 is a logic flow diagram illustrating the user interface with the smart form in accordance with the present invention.

Logic flow diagram 600 (FIG. 6) illustrates the processing of the pre-processed smart form by computer 102A (FIG. 1) in the context of the illustrative example of an employee earning a bonus vacation. In step 602 (FIG. 6), computer 102A (FIG. 1) receives the pre-processed form and presents the form to the employee. In this example, the pre-processed form presents pre-populated fields indicating, inter alia, the hours worked by the employee, the time for which the employee has worked for the subject company, the employee's department and location, and the vacation packages for which the employee is qualified.

In step 604 (FIG. 6), the employee enters form data for respective fields. Such fields include, for example, dates and number of days of the requested vacation and a selected one of the vacation packages for which the employee has qualified.

In test step 606 (FIG. 6), computer 102A (FIG. 1) executes resolved verification annotations to determine whether form data entered by the employee is valid. If not, computer 102A displays a notice to the employee indicating that the entered form data is non-conforming in step 608 (FIG. 6) and processing transfers back to step 602. Conversely, if the entered form data satisfies the resolve verification annotation, processing transfers to step 610 in which the form data is accepted. Once all fields have valid form data entered, the completed, valid form is sent to application 110A (FIG. 1).

In step 412 (FIG. 4), application 110A receives the verified, completed form. In step 414, application 110A (FIG. 2) continues with processing workflow 202. In this example, continuing processing of workflow 202 includes requesting authorization from one or more managers of the employee for the requested vacation, providing to the employee a pass enabling the employee and the employee's family to gain entrance at an establishment for the requested vacation, and noting in accounts payable that the requested and authorized vacation must be paid for. The pass can be, for example, a multiple day pass at an amusement park.

In addition, continuing processing of workflow 202 can include storing of some or all of the form data in database 116 (FIG. 1) thereby providing a more complete record of the employee in database 116. For example, the specific days for which the employee will be on vacation can be stored in database 116 and can be included in requests to the employee's managers for vacation authorization for other employees. Thus, the manager can base authorization or rejection of a requested vacation with vacation schedules of other employees in mind. In addition, vacation schedules of other employees as represented in database 116 can be included in verification annotations such as verification annotation 308 (FIG. 3) to further automate the vacation scheduling process and reduce the workload of the managers of the employee.

Scalable Architecture

Figure 7A:
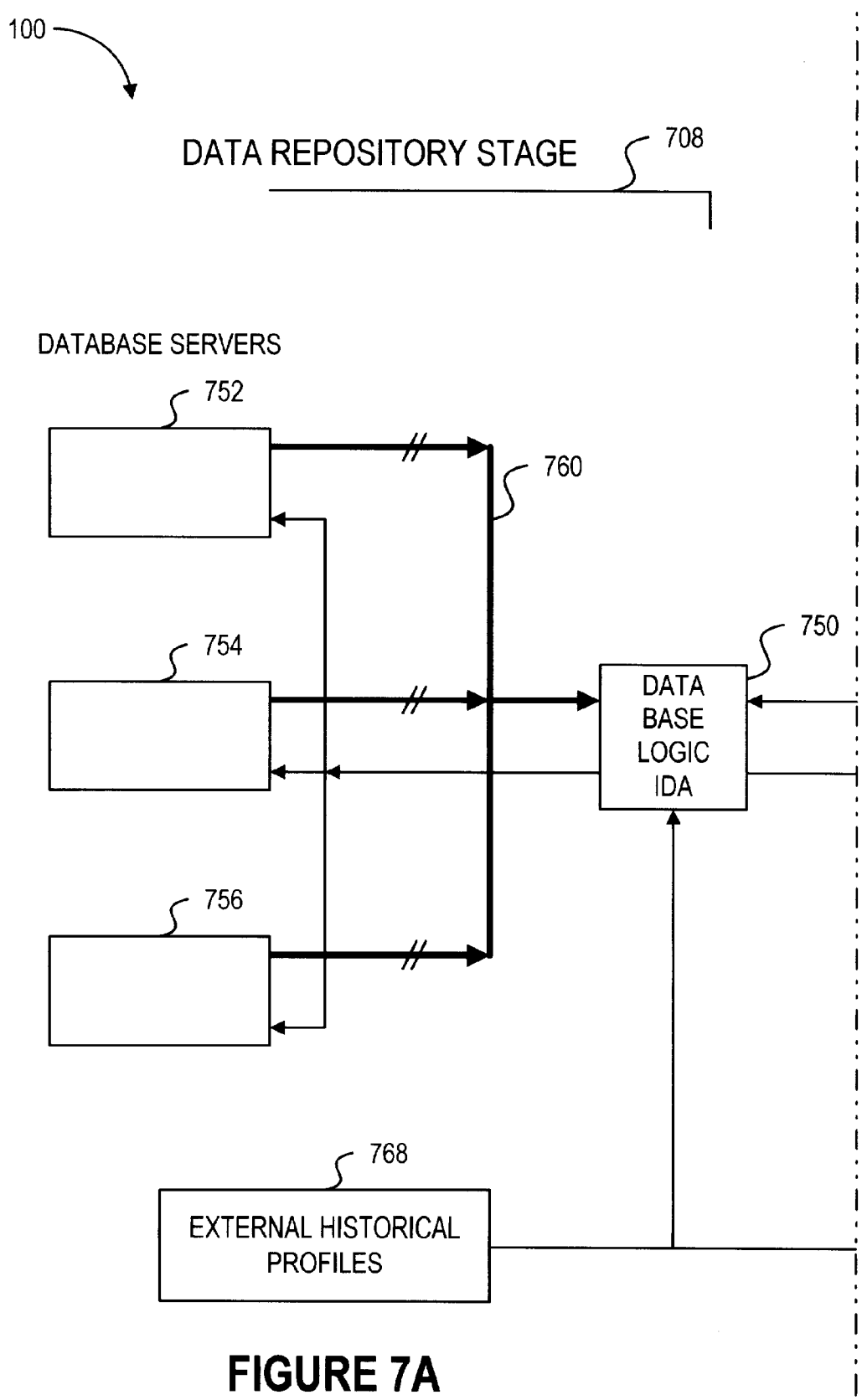
FIG. 7 is a block diagram showing components of the computer system of FIG. 1 in greater detail.
Figure 7B:
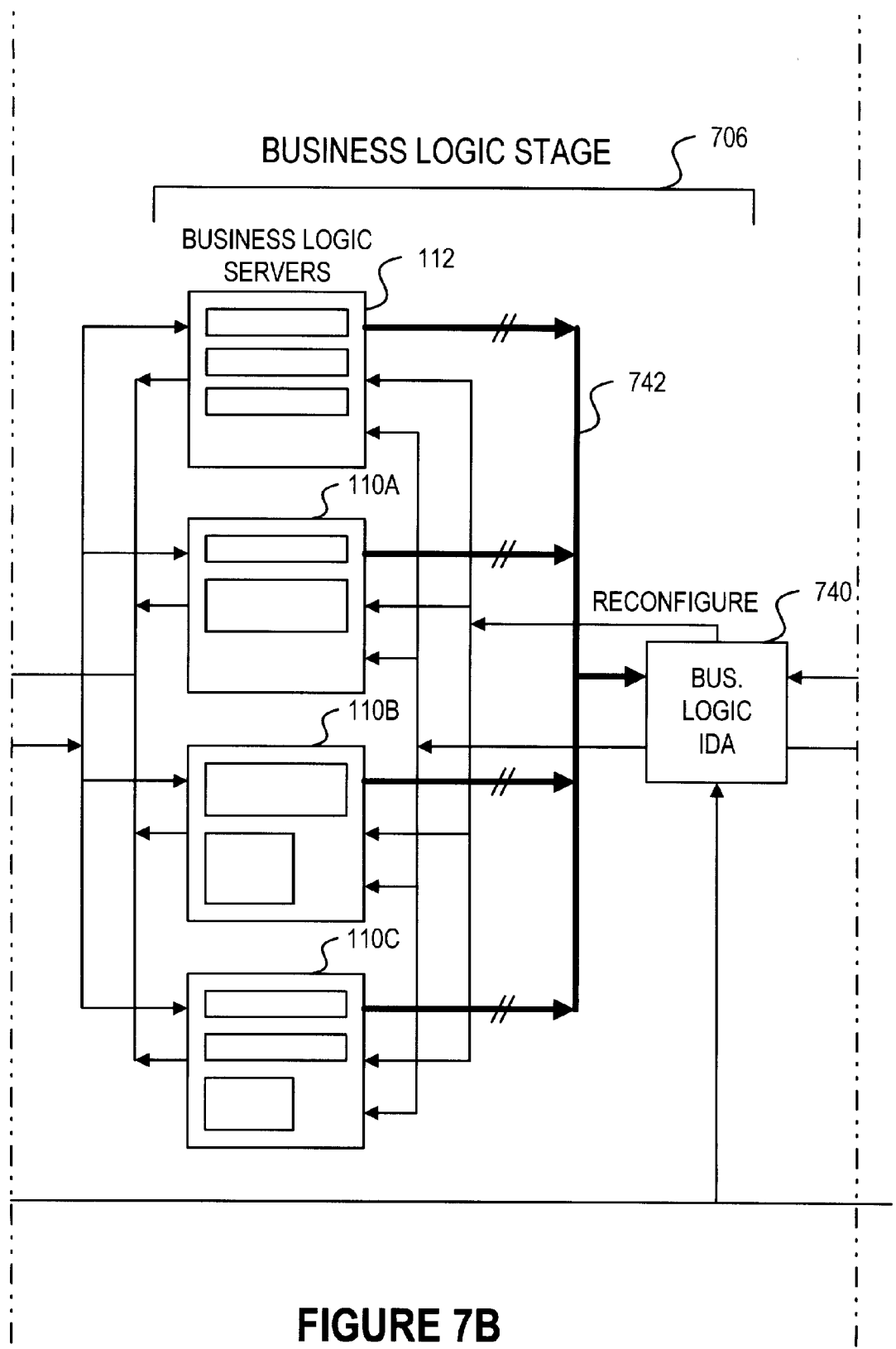
Figure 7C:
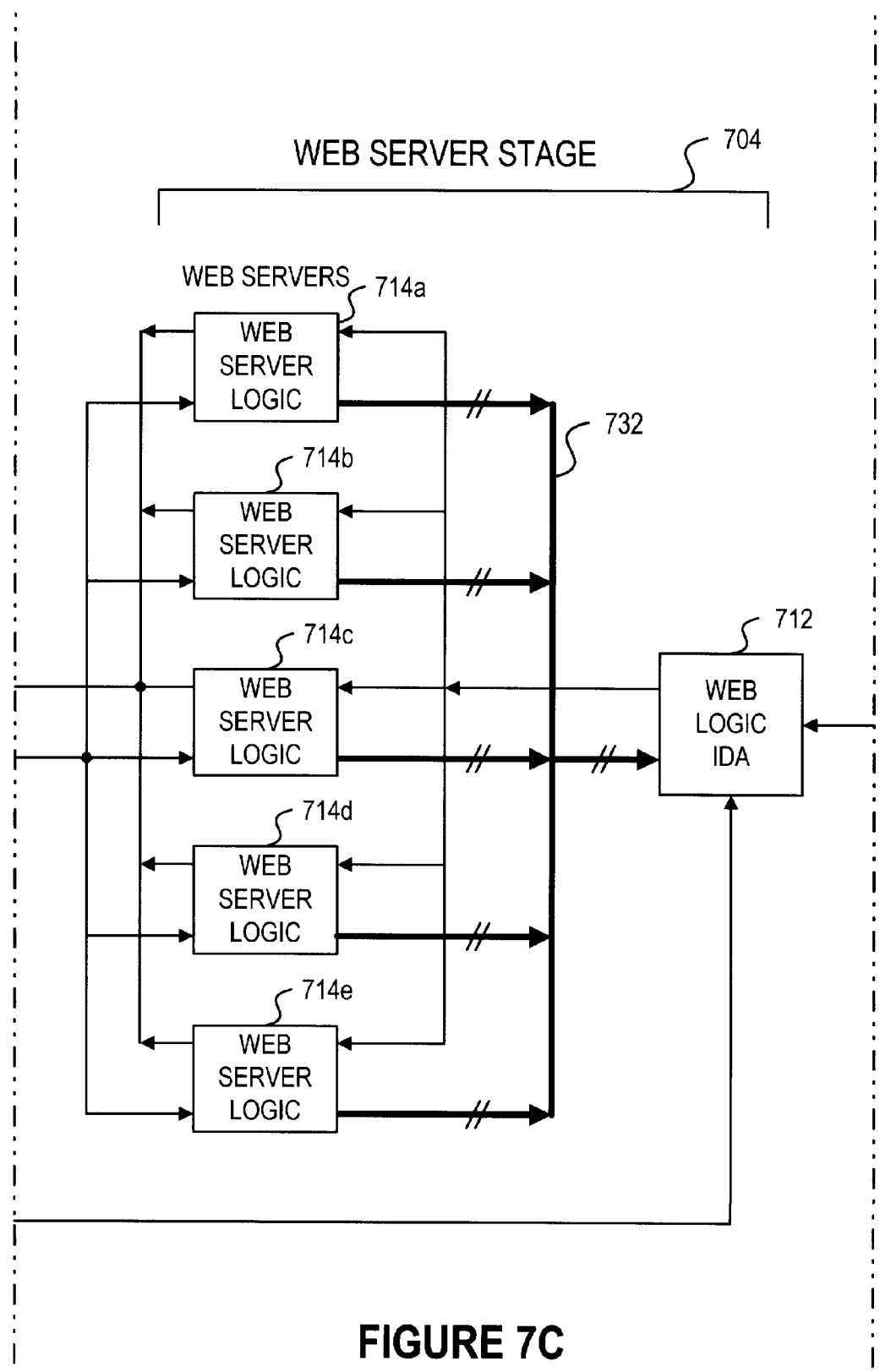

The architecture of scalable network server 108, applications 110A–B, business logic 112, API 114, and database 116 is shown in greater detail in FIG. 7.

In particular, FIG. 7 shows a clustered computer system architecture wherein an intelligent director agent (IDA) is included with each of the clusters that implement a web-server stage, a business logic stage, and a data repository stage. Preferably, there is an IDA for each cluster, although more than one cluster may be provided per stage, in which case multiple IDAs may be provided. Furthermore, as will be discussed later herein, the clusters may be disposed at one local site or may be dispersed among geographically remote locations. Note that although FIG. 7 shows an intelligent director agent for each of these stages, it is contemplated that in some clustered computer systems, not every stage needs to be provided with an intelligent director agent and that significant benefits may be achieved by endowing even only one of the stages with one or more intelligent director agents. Conversely, a stage may comprise multiple clusters, in which case multiple IDAs may be provided.

With reference to FIG. 7, there is shown portions of computer system 100, which is typically connected to wide area network 106 as described above. In particular, FIG. 7 shows a webserver stage 704 which includes scalable server 108, a business logic stage 706 which includes business logic 112 and applications 110A–B, and a data repository stage 708 which includes API 114 and database 116.

Data repository stage 708 represents the stage wherein data for use by the business logic software modules are kept and includes the data stores as well as the database logic employed to access the data stores. Business logic stage 706 represents the stage wherein the computer cluster(s) employed to execute business logic 112 and applications 110A–B is implemented. For simplicity, only one cluster comprising four business logic servers is shown in FIG. 7. Webserver stage 704 represents the stage wherein the computer cluster(s) employed to execute scalable network server 108 is implemented. Webserver stage 704 generally facilitates the users' interaction with the rest of computer system 100 using the web-based paradigm or a suitable paradigm for interacting with wide area network 106 (FIG. 1). Again, only one cluster comprising five webservers is shown in FIG. 7 to simplify the illustration.

In the case of FIG. 7, the servers within each stage and within each cluster may be heterogeneous (i.e., implemented on different platforms and having different capability) and each may operate a different set of business logic modules, i.e., application software modules. By way of example, business logic 112 and applications 110A–C within business logic stage 706 may be implemented using different hardware/software platforms and configurations that are adapted for operating business logic 112 and applications 110A–B implemented therein. In other words, there is no requirement in the present invention that the servers associated with a given stage or cluster or even those running copies of a particular software module be homogeneous (although such can be readily accommodated by the instant computer system architecture without any major modification). As long as the servers in a cluster can communicate with the IDA that is associated with that cluster and can be adapted to operate cooperatively with one another within a cluster, the servers can be implemented in the cluster architecture of the present invention. It should be noted that the technologies, protocols, and methodologies exist for allowing heterogeneous computers to communicate and work cooperatively and will not be discussed in greater detail herein.

Beginning with the user's access request via path 710 (by, for example, typing in the Uniform Resource Locator or URL at the user's web browser in computer 102A—FIG. 1), the request is forwarded to a webserver logic intelligent director agent (IDA) 712, which decides among the webservers 714a–714e as to which of these webservers should service this user's access request. As a threshold determination, webserver logic IDA 712 may ascertain whether the user had recently accessed the service through a particular webserver of webserver stage 704. If so, there may be data pertaining to this user that is cached at that particular webserver, and it may be more efficient to continue assigning this user to that webserver to take advantage of the cached data.

On the other hand, if it is determined that this user has not recently accessed the service or if there is no cached data pertaining to this user on any of the webservers, webserver logic IDA 712 may assign the user to one of webservers 714a–714e. The decision of which webserver to assign may be made based on the current relative load levels on the respective webservers, the information pertaining to which is periodically received by webserver logic IDA 712 from the webservers through path 732. Additionally, webserver logic IDA 712 also receives additional information pertaining to the webservers and the webserver logic software modules implemented on the webservers to facilitate improved access speed and reliability. Thus, the webserver logic IDA 712 arbitrates among the webserver computers based not only on the relative load level information associated with the individual webservers but also based on information pertaining to the individual webserver logic software modules.

The assigned webserver may authenticate the user to ascertain whether the user is registered and/or properly authorized to use the service offered through computer system 100. After successful authentication, if the user subsequently indicates that he wishes to employ a particular business logic software. i.e., a particular one of applications 110A–B (by, for example, inputting data or taking an action that requires the attention of a particular business logic module), the webserver assigned to him then accesses a business logic IDA 740 to ascertain the appropriate business logic server (i.e., the appropriate server in the business logic stage such as one of business logic 112 or applications 110A–C) to which the user's transaction request may be sent.

The decision pertaining to which business logic server to assign may be made based on the current relative load levels on the respective business logic servers, the information pertaining to which is periodically received by business logic IDA 740 from the business logic servers through path 742. Additionally, business logic IDA 740 also receives additional information pertaining to the business logic servers and more importantly the business logic software modules implemented on the business logic servers to facilitate improved access speed and reliability. Accordingly, the routing decision taken by the business logic; IDA is based not only on information pertaining to the individual business logic servers but also based on information pertaining to the individual business logic software modules implemented thereon.

The availability of the additional business logic server-specific information and the business logic module-specific information also facilitates inventive techniques to improve access speed and reliability during software upgrades, to maintain a desired level of fault tolerance for the business logic software and/or the business logic servers, to reactively and/or prospective load balance among the business logic servers, and to efficiently employ remote business logic servers to accomplish improving access speed and reliability. Some of the additional data kept by the business logic IDA and their roles in improving access speed and reliability in accordance with embodiments of the present invention will be discussed later herein.

Each of the business logic software programs, i.e., business logic 112 and applications 110A–B, has many copies distributed among the servers of the cluster to facilitate redundancy and scalability.

Once a business logic server having thereon the requisite business logic module to service the user's transaction request is assigned to service the incoming transaction request, subsequent traffic between the webserver assigned earlier to that user and the assigned business logic server may be (but is not required to be) transmitted directly without going through the assigned business logic IDA.

If the business logic module employed by the user requires data from data repository stage 708, the business logic software module, through the business logic server, may consult yet another IDA (shown in FIG. 7 as database logic IDA 750), which picks the most suitable database server 752, 754, and/or 756 for serving up the data. The decision regarding which database server to assign may be made based on the current relative load level on the respective database servers that have the necessary data, the information pertaining to which is periodically received by database logic intelligent director agent 750 from the database servers through path 760. Like the business logic IDA and the webserver IDA, however, the database logic IDA 750 also receives additional information pertaining to the database servers as well as the database server logic modules implemented on the database servers to facilitate improved access speed and reliability. Once a database server having thereon the requisite data to service the user's transaction request is assigned, subsequent traffic between the business logic server that requests the data and the assigned database server may be (but is not required to be) transmitted directly without going through the assigning database logic IDA.

In one embodiment, an IDA may be co-located with the router that routes the traffic to the servers of the cluster, or it may be implemented separately from the router. It should be kept in mind that although FIG. 7 shows an IDA for each of the webserver stage, the business logic stage, and the data repository state, there is no requirement that there must be an IDA for each stage, or each cluster for that matter if there are multiple clusters per stage. The provision of an IDA, even with only one cluster or one stage of the clustered computer system, dramatically improves access speed and reliability even when other clusters and stages may be implemented without IDAs.

As mentioned earlier, an intelligent directory agent (IDA) receives more than just load status data from the servers it services. With reference to business logic intelligent director agent (IDA) 740, for example, it is preferable that the business logic IDA tracks one or more of the additional information such as server processing capability, server geographic identification (e.g., remote or local to the site that implements the webserver stage and/or the data repository stage), the average latency for servicing a transaction request (e.g., due to the server's geographic remoteness or the speed of the network connection), the list of business logic modules that are compatible with each server, the list of the business logic modules actually implemented on each server, the version of the business logic modules implemented, and/or the load experienced by the business logic modules on the servers. In one embodiment, the business logic IDA also receives information pertaining to external historical profiles (768) of transaction requests and processing loads on the business logic modules and/or the business logic servers in order to predict usage demands placed on the business logic modules and to prospectively balance the loads among the business logic servers if needed so that an anticipated surge in usage does not overwhelm any particular business logic module.

Figure 8A:
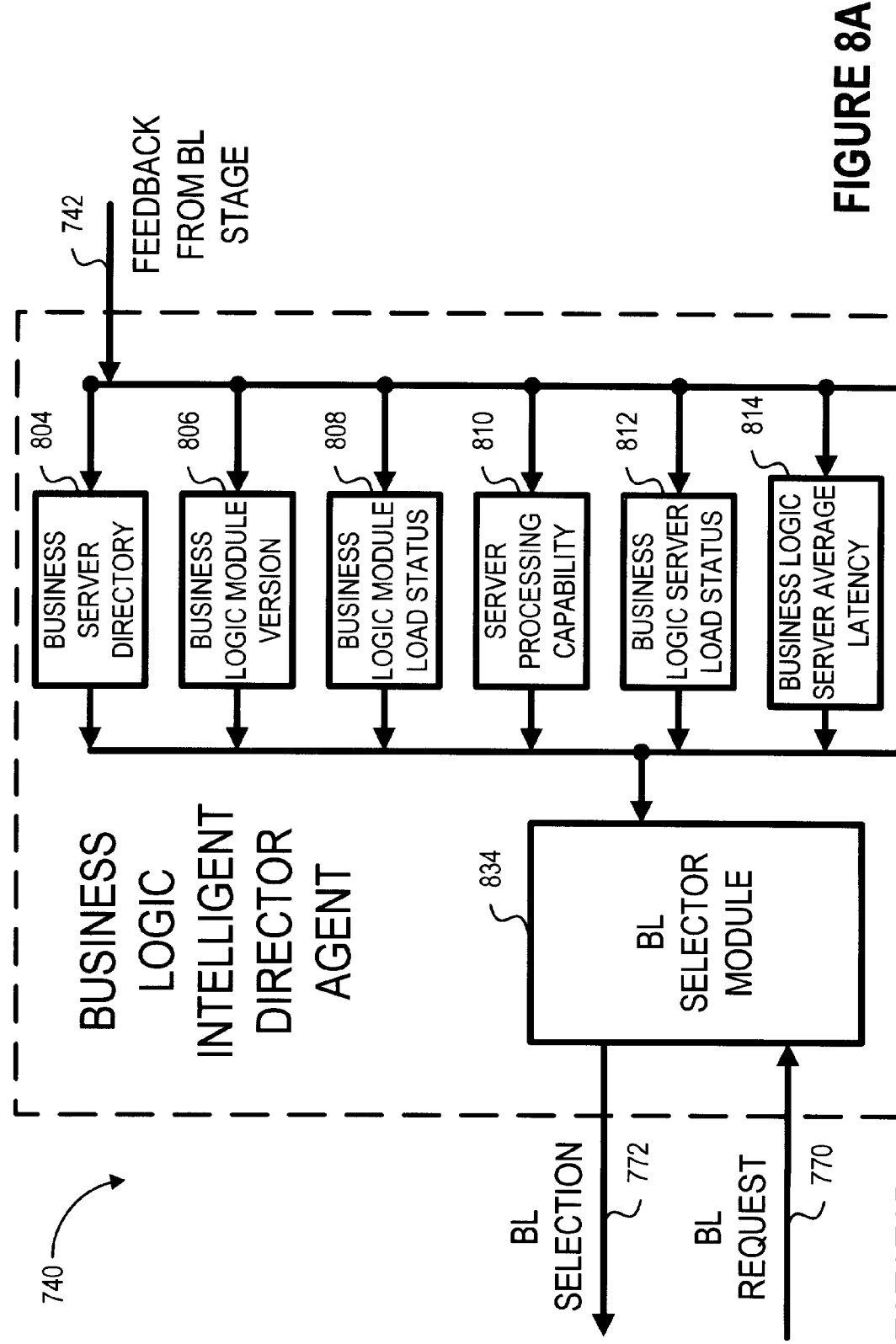
FIG. 8 is a block diagram showing a business logic intelligent director agent of FIG. 7 in greater detail.

FIG. 8 illustrates, in accordance with one embodiment of the present invention, a simplified logic block diagram of an exemplary business logic intelligent director agent (IDA) 740. Although only the business logic IDA is described in details herein, the webserver logic IDA and the database logic IDA may be similarly formed. However, their similar construction will not be discussed in details for brevity sake. With reference to FIG. 8, business logic requests from the webservers are received by business logic IDA 740 via path 770. Within business logic intelligent director agent 740, both server-specific and software-specific information is received and maintained in addition to the relative load status on individual business logic servers.

Some of the additional pieces of information are received from the business logic servers via path 742 and stored in exemplary blocks 804, 806, 808, 810, 812, 814, and 816, respectively. For ease of illustration, not every piece of information is shown in FIG. 8. Note that some of information is static and may be received as part of the registration process that the servers underwent as they were installed into the cluster. Examples of such static information includes server processing capability and business logic module version number. Other information may be dynamically received by the IDA from the servers (such as the list of business logic modules implemented on each server) and other network monitoring tools (such as conventional software tools that track network congestion at specific locations). Still, other information may be derived from the information received dynamically and/or statically (such as the average latency time for servers, which may be calculated periodically based on average network latency between the webserver and the business logic server, the average network latency between the business logic server and the available database cluster, the processing capability of the servers, and the like).

Business server directory 804 may track information pertaining to the list of business logic servers available to the clustered computer system, their remote/local status, their certified/uncertified status (which may be expressed as Boolean values or may be a numerical value that reflects their preference in receiving and servicing transaction requests), the list of business logic servers capable of being loaded with a particular business logic software, the list of business logic servers capable of being used for running a particular business logic module, theirs relative weight which reflects the relative preference with which traffic should be directed to the individual servers (e.g., due to network conditions or other factors), and the like.

Business logic module version block 806 may track information pertaining to the software versions of the business logic modules implemented on the various business logic servers. Further, business logic version block 806 may track information pertaining to the certified/uncertified status of each copy of the business logic modules, the relative weight of each copy of business logic module which reflects the relative preference with which traffic should be directed to it, and the like.

Business logic module load status block 808 may track information pertaining to the level of load currently experienced by the individual business logic modules (in number of transactions per second or the number of users currently using a business logic module, for example). This information may be tracked for business logic modules currently in operation, individually and/or as a group average.

Server processing capacity block 810 may track the processing capability (again in number of transactions per second or the number users that can be supported concurrently) of the individual business logic servers in order to ascertain how much bandwidth a particular server may have, how much has been used, and how much is available.

Business logic server load status block 812 may track a similar type of data as business logic module load status, albeit at the server level instead of the business logic module level. Business logic server average latency block 814 may track the average latency to be expected if a particular business logic server is employed to service the transaction request. The average latency may be calculated based on the processing capability of the server, how remote it is from the webserver that issues the transaction request (which is impacted by network latency), how remote it is from the database that may be needed to service the transaction request (which is also impacted by network latency). Business logic server log file block 816 may track the operational status of the business logic server and/or the business logic modules implemented thereon to determine, for example, the length of time that the server and/or the business logic module has been in operation without failure and other types of log file data.

Business logic intelligent director agent 740 also includes a data mining module 830, which receives the external historical profiles (768 of FIG. 7) of past usage trends on the various business logic modules and/or business logic servers, and ascertains prospectively the load demand on the various business logic modules and/or business logic servers. Data mining module 830 may be implemented using a variety of available data mining methodologies.

Using the server-specific and the business logic module-specific information available, a business logic selector module 834 then selects one of the business logic servers to service the pending business logic request and transmits the selection to the requesting webserver via path 772.

Within business logic intelligent director agent 740, there is also shown a configuration module 840, representing the module that either reactively or prospectively reconfigures and/or reshuffles the business logic modules among the business logic servers to permit the clustered computer system to better handle the processing load and to achieve the desired level of fault tolerance.

The above description is illustrative only and is not limiting. The present invention is limited only by the claims which follow.

What is claimed is:

1. A method for using a data-entry form to receive data entered by a user, the method comprising:
   including one or more fields in the data-entry form;
   for each of the one or more fields,
      including verification logic which, when executed, determines whether form data entered by the user is valid for the field; and
   sending the data-entry form with the verification logic through a computer network to a remote computer for entry of the data by the user such that the remote computer receives the data entered by the user and executes the verification logic.

2. The method of claim 1 wherein the verification logic includes one or more references to data items stored in a database, the method further comprising:
   resolving the references to replace the references in the verification logic with data values of the data items retrieved from the database.

3. The method of claim 2 further comprising:
   identifying the user; and
   wherein the data items retrieved from the database are associated with the user within the database.

4. The method of claim 2 further comprising:
   receiving data entered by the user in completing the data-entry form; and
   storing the data entered by the user in the database.

5. The method of claim 1 further comprising:
   for each of the one or more fields,
      determining default data values for the field according to data items retrieved from a database.

6. The method of claim 5 further comprising:
   identifying the user; and
   wherein the data items retrieved from the database are associated with the user within the database.

7. The method of claim 5 further comprising:
   receiving data entered by the user in completing the data-entry form; and
   storing the data entered by the user in the database.

8. A computer readable medium useful in association with a computer which includes a processor and a memory, the computer readable medium including computer instructions which are configured to cause the computer to use a data-entry form to receive data entered by a user by:
   including one or more fields in the data-entry form;
   for each of the one or more fields,
      including verification logic which, when executed, determines whether form data entered by the user is valid for the field; and
   sending the data-entry form with the verification logic through a computer network to a remote computer for entry of the data by the user such that the remote computer receives the data entered by the user and executes the verification logic.

9. The computer readable medium of claim 8 wherein the verification logic includes one or more references to data items stored in a database; and
   wherein the computer instructions are further configured to cause the computer to build a data-entry form by:
      resolving the references to replace the references in the verification logic with data values of the data items retrieved from the database.

10. The computer readable medium of claim 9 wherein the computer instructions are further configured to cause the computer to build a data-entry form by:
    identifying the user; and
    wherein the data items retrieved from the database are associated with the user within the database.

11. The computer readable medium of claim 9 wherein the computer instructions are further configured to cause the computer to build a data-entry form by:
    receiving data entered by the user in completing the data-entry form; and
    storing the data entered by the user in the database.

12. The computer readable medium of claim 8 wherein the computer instructions are further configured to cause the computer to build a data-entry form by:
    for each of the one or more fields,
       determining default data values for the field according to data items retrieved from a database.

13. The computer readable medium of claim 12 wherein the computer instructions are further configured to cause the computer to build a data-entry form by:
    identifying the user; and
    wherein the data items retrieved from the database are associated with the user within the database.

14. The computer readable medium of claim 12 wherein the computer instructions are further configured to cause the computer to build a data-entry form by:
    receiving data entered by the user in completing the data-entry form; and
    storing the data entered by the user in the database.

15. A computer system comprising:
    a processor;
    a memory operatively coupled to the processor; and
    a form building module (i) which executes in the processor from the memory and (ii) which, when executed by the processor, causes the computer to use a data-entry form to receive data entered by a user by:
       including one or more fields in the data-entry form;
       for each of the one or more fields,
          including verification logic which, when executed, determines whether form data entered by the user is valid for the field; and
       sending the data-entry form with the verification logic through a computer network to a remote computer for entry of the data by the user such that the remote computer receives the data entered by the user and executes the verification logic.

16. The computer system of claim 15 wherein the verification logic includes one or more references to data items stored in a database; and wherein the form building module is further configured to cause the computer to build a data-entry form by:

resolving the references to replace the references in the verification logic with data values of the data items retrieved from the database.

17. The computer system of claim 16 wherein the form building module is further configured to cause the computer to build a data-entry form by:

identifying the user; and wherein the data items retrieved from the database are associated with the user within the database.

18. The computer system of claim 16 wherein the form building module is further configured to cause the computer to build a data-entry form by:

receiving data entered by the user in completing the data-entry form; and storing the data entered by the user in the database.

19. The computer system of claim 15 wherein the form building module is further configured to cause the computer to build a data-entry form by:

for each of the one or more fields, determining default data values for the field according to data items retrieved from a database.

20. The computer system of claim 19 wherein the form building module is further configured to cause the computer to build a data-entry form by:

identifying the user; and wherein the data items retrieved from the database are associated with the user within the database.

21. The computer system of claim 19 wherein the form building module is further configured to cause the computer to build a data-entry form by:

receiving data entered by the user in completing the data-entry form; and storing the data entered by the user in the database.

* * * * *